(12) United States Patent
Ogata

(10) Patent No.: US 7,511,865 B2
(45) Date of Patent: Mar. 31, 2009

(54) IMAGE SCANNING APPARATUS

(75) Inventor: Atsushi Ogata, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 10/671,616

(22) Filed: Sep. 29, 2003

(65) Prior Publication Data
US 2004/0114202 A1 Jun. 17, 2004

(30) Foreign Application Priority Data
Sep. 30, 2002 (JP) .............................. 2002-286670

(51) Int. Cl.
*H04N 1/04* (2006.01)
(52) U.S. Cl. ...................................... 358/498; 358/400
(58) Field of Classification Search .......... 358/400–498
See application file for complete search history.

(56) References Cited

U.S. PATENT DOCUMENTS 5,267,059 A * 11/1993 Kawabata et al. ........... 358/498
5,903,811 A * 5/1999 Kobayashi et al. .......... 399/367
5,995,801 A * 11/1999 Katsuta et al. .............. 399/367
2002/0044309 A1 4/2002 Araki et al. ................. 358/514
2003/0007199 A1 1/2003 Ogata ......................... 358/505

FOREIGN PATENT DOCUMENTS

JP 7-304537 11/1995

* cited by examiner

*Primary Examiner*—Douglas Q Tran
(74) *Attorney, Agent, or Firm*—Fitzpatrick, Cella, Harper & Scinto

(57) ABSTRACT

The invention provides an image scanning apparatus stabilizing a behavior of a document in scanning an image and enabling to promote image scanning accuracy. The image scanning apparatus according to the invention includes a resist roller 22 for feeding a document, a discharge roller 28 disposed in a feeding direction of the resist roller 22 for feeding the document and a first optical carriage A for scanning the image of the document in feeding the document by the resist roller 22 and the discharge roller 28. The resist roller 22 and the discharge roller 28 are respectively driven by a first motor 150 and a second motor 160. Further, when the document is charged to the discharge roller 28, document feed speed of the resist roller 22 in scanning document is made to be increased.

8 Claims, 3 Drawing Sheets

IMAGE SCANNING APPARATUS

BACKGROUND OF THE INVENTION

1. Field of the Invention

The present invention relates to an image scanning apparatus, particularly, the invention is preferably applied to an image scanning apparatus having a function of scanning a flowing image of a document fed at predetermined speed.

2. Description of the Related Art

In related arts, the following two systems are well known as systems adopted in image scanning apparatus for scanning an image on a document.

First, a first system is a fixed document scanning system for scanning an image on a document by an image scanning portion by setting the document on a document base of an image scanning apparatus by a predetermined method and scanning the document fixed onto a reference document base glass by a movable optical carriage.

Further, a second system is a flowing document scanning system fox scanning the image on the document by feeding the document at predetermined feed speed by a predetermined scanning portion arranged with a fixed optical carriage portion.

According to the later of the flowing document scanning system, the optical carriage can be fixed and the optical carriage needs not to reciprocate at respective times. Therefore, according to the flowing document scanning system, an apparatus constitution is not complicated in comparison with the former of the fixed document scanning system.

Further, the flowing document scanning system is superior to the former of the fixed document scanning system also in view of high speed formation of processings.

Further, by using the image scanning systems in a copier, even when a plurality of sheets of copies are formed from the same document, the document is scanned only by one time. This is because according to a copier having a scanning function, it can easily be carried out to temporarily hold image information which is scanned once at a storage medium of a computer or the like as digital information and output again a necessary number of sheets of copied images based on the stored image information. Further, by using the above-described flowing document scanning system in the copier, the high speed formation of processings or simplification of a structure of the copier per se can be promoted.

Further, there is an image scanning apparatus for scanning images on two faces of a document including the images on a top side and a bottom side thereof. Such an image scanning apparatus is constituted to provide two optical carriages for scanning the images included in the respective faces of the document by the respective optical carriages provided along a feed path of the document from a view point of achieving convenience and high speed formation of operation.

Therefore, according to the apparatus constitution, the flowing images on the top side and on the bottom side of the document fed along the predetermined path can be scanned substantially simultaneously and therefore, high speed formation of a scanning processing in copying the two faces of the document can be achieved.

However, according to the above-described image scanning apparatus of the flowing document scanning system, a disturbance in a behavior of the document in scanning effects adverse influence on scanning accuracy. The disturbance of the behavior of the document in scanning is brought about by a change in feed speed of the document or upward and downward movement of the document in the feed path to cause to elongate or contract the scanned image or disturb the image abruptly. Further, when the image scanning apparatus of the flowing document scanning system is a color scanner, respective colors are scanned by elements of scanning the respective colors aligned in a document feed direction at timings in compliance with the feed speed of the document and electrically overlapped to be output again as a color image. Therefore, the colors of the scanned image are shifted to emerge by disturbing the behavior of the document in feeding.

From such a reason, high accuracy is requested in feeding the document in the image scanning apparatus of the flowing document scanning system. In order to meet the request, there is a flowing document scanning system for driving rollers for feeing a plurality of documents by separate motors and enabling to set the feed speed of the document further finely.

According to the image scanning apparatus of the flowing document scanning system, dispersion in a dimension of a roller for feeding the document or integration thereof or a change in an outer shape by an ageing change of the roller can be adjusted for each machine.

Further, according to the above-described image scanning apparatus of the flowing document scanning system, it is possible to set to stabilize feeding of the document by producing an arbitrary speed difference between the feed speeds of the respective rollers.

However, by producing the speed difference between the respective rollers, there poses a problem that depending on by which roller the document is fed or at which position the document is fed, the scanning speed of the document is changed in scanning or the behavior or the feed speed of the document is changed at an instance of charging the document to the roller or at an instance of separating a rear end thereof from the roller to thereby bring about disturbance or color shift of the image.

SUMMARY OF THE INVENTION

It is an object of the invention to provide an image scanning apparatus stabilizing a behavior of a document in scanning an image and enabling to promote image scanning accuracy.

In order to resolve the above-described problem, the invention adopts the following means.

That is, according to a first aspect of the invention, there is provided an image scanning apparatus comprising first feeding means for feeding a document, second feeding means disposed downstream from the first feeding means in a feeding direction for feeding the document, first driving means for driving the first feeding means, second driving means for driving the second feeding means, image scanning means for scanning an image of the document which passes a scanning position provided between the first feeding means and the second feeding means, and speed controlling means for controlling feed speeds of the first feeding means and the second feeding means by controlling the first driving means and the second driving means, wherein the speed controlling means controls the first driving means and the second driving means such that the feed speed of the second feeding means when a front end of the document is charged to the second feeding means becomes faster than the feed speed of the second feeding means when the document is fed by both of the first feeding means and the second feeding means after the front end of the document has been charged to the second feeding means.

By providing the speed controlling means, a resistance when the front end of the document is charged to the second feeding means is reduced and therefore, deterioration in the behavior of the document can be restrained. Therefore, the scanning accuracy can be promoted.

Further, according to a second aspect of the invention, there is provided an image scanning apparatus comprising first feeding means for feeding a document, second feeding means disposed downstream from the first feeding means in a feeding direction for feeding the document, first driving means for driving the first feeding means, second driving means for driving the second feeding means, image scanning means for scanning an image of the document which passes a scanning position provided between the first feeding means and the second feeding means, and speed controlling means for controlling feed speeds of the first feeding means and the second feeding means by controlling the first driving means and the second driving means, wherein the speed controlling means controls the first driving means and the second driving means such that a ratio of the feed speed of the first feeding means to the feed speed of the second feeding means is made to differ in accordance with a scanning speed of the document by the image scanning means.

By the above-described constitution, a disturbance of the behavior of the document when a rear end of the document comes off the first feeding means can be restrained and therefore, the feeding accuracy of the document can be promoted by stabilizing the behavior of the document and the scanning accuracy is promoted.

Further, according to a third aspect of the invention, there is provided an image scanning apparatus comprising first feeding means for feeding a document, second feeding means disposed downstream from the first feeding means in a feeding direction for feeding the document, first driving means for driving the first feeding means, second driving means for driving the second feeding means, image scanning means for scanning an image of the document which passes a scanning position provided between the first feeding means and the second feeding means, and speed controlling means for controlling feed speeds of the first feeding means and the second feeding means by controlling the first driving means and the second driving means, wherein the speed controlling means controls the first driving means and the second driving means such that the feed speed of the second feeding means becomes faster than the feed speed of the first feeding means and the speed controlling means controls to switch the feed speed of the first feeding means and/or the feed speed of the second feeding means in accordance with a kind of the document. By the above-described constitution, the behavior of the document can be stabilized in accordance with the kind of the document and therefore, the feeding accuracy of the document can be promoted and the scanning accuracy can be promoted.

DESCRIPTION OF THE PREFERRED
EMBODIMENTS

A detailed explanation will be given to exemplify the preferred embodiments of the invention in reference to the drawings as follows. However, dimensions, materials, shapes and relative arrangements of constituent parts described in the embodiments are not intended to limit the range of the invention only thereto unless specified particularly.

An explanation will be given of the embodiments when applied to an image scanning apparatus provided to a digital copier in reference to the drawings as follows.

First Embodiment

Figure 1:
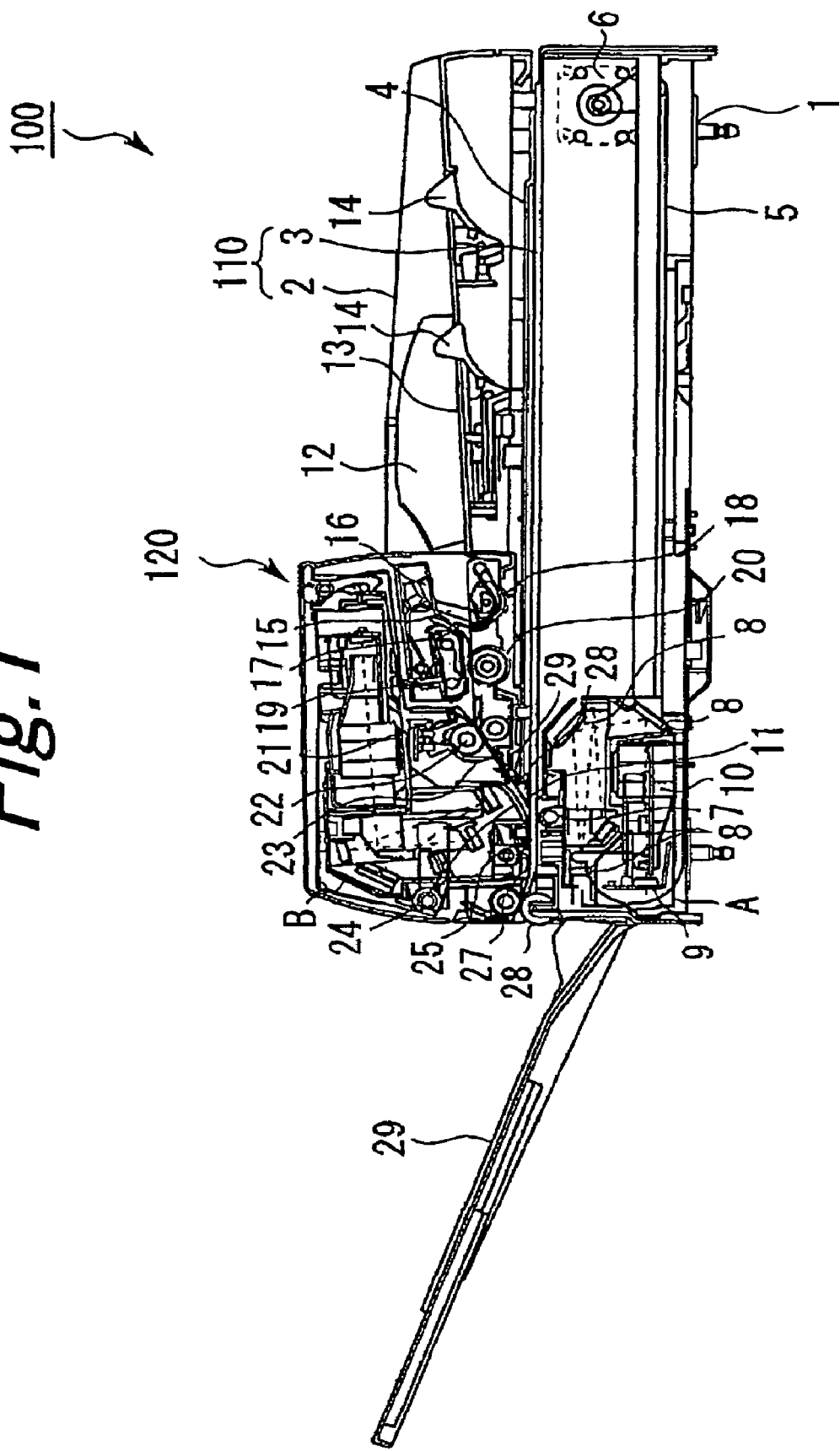
FIG. 1 is a side sectional view showing an outline of a structure of an image scanning apparatus according to a first embodiment, a second embodiment and a third embodiment.

FIG. 1 is a side sectional view showing an outline of a structure of an image scanning apparatus 100 provided to a digital copier according to the first embodiment. Further, FIG. 2 is a side sectional view enlarging an essential portion showing a document feed mechanism 120 of the image scanning apparatus 100.

Figure 2:
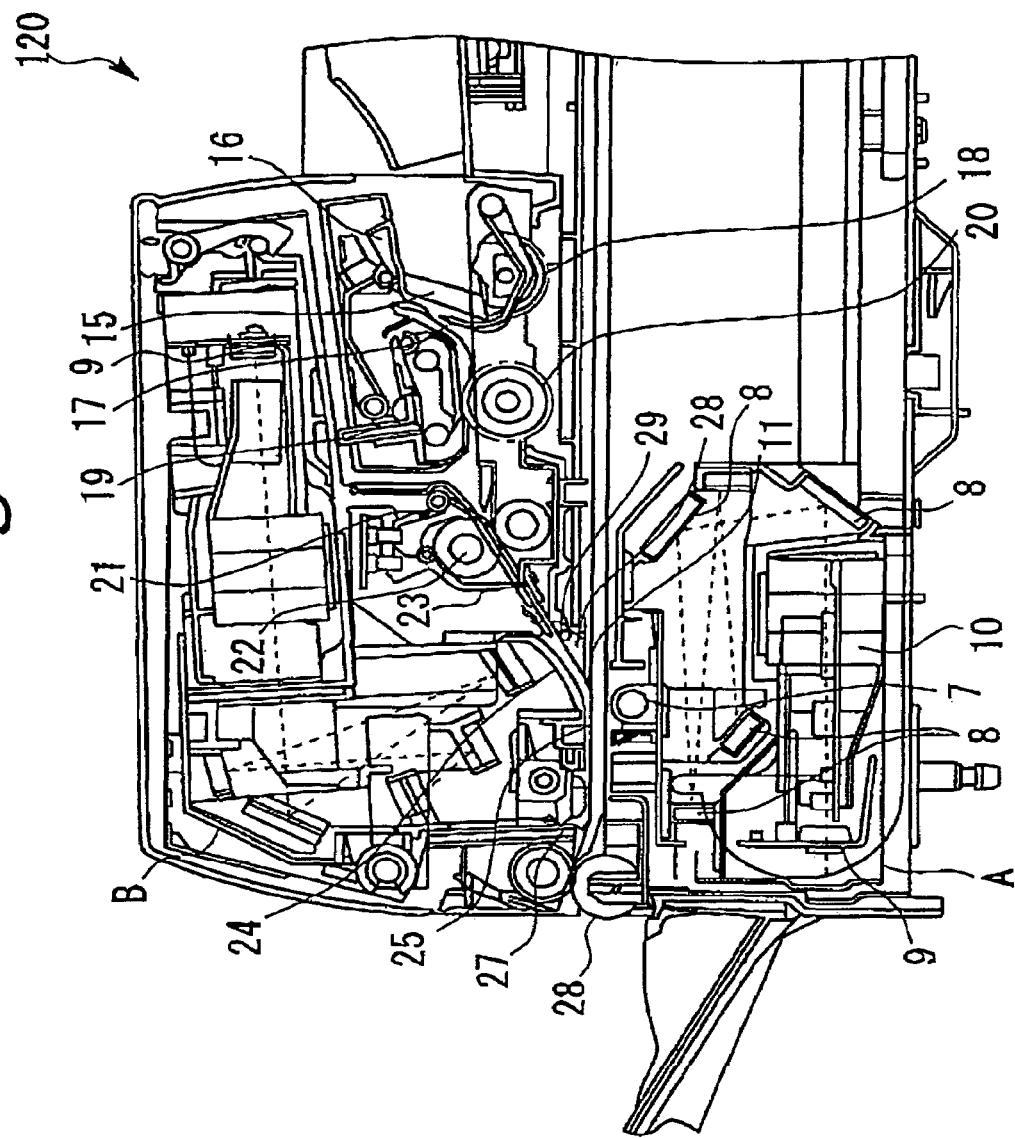
FIG. 2 is a sectional view enlarging an essential portion of a document feed mechanism of the image scanning apparatus according to the first embodiment, the second embodiment and the third embodiment.

As shown by FIG. 1 and FIG. 2, the image scanning apparatus 100 is constituted by a flatbed image scanning portion 1 for mounting and fixing a document and scanning an image on a surface thereof and an automatic feed apparatus 2 attached to an upper face of the flatbed image scanning portion 1.

Further, a flowing document scanning portion is constituted by compounding a portion of the flatbed image scanning portion 1 and a portion of the automatic feed apparatus 2.

The flatbed image scanning portion 1 is a mechanism of scanning the surface image of the document mounted and fixed thereon. A reference document base glass 3 comprising a light transmitting plate material for mounting the document is provided at an upper face of the flatbed image scanning portion 1. Further, there is provided a first optical carriage A as first image scanning means for scanning the document below the reference document base glass 3.

The first optical carriage A is connected to an endless drive belt 5. The drive belt 5 is connected to a drive motor 6. By transmitting power of the drive motor 6 to the first optical carriage A via the drive belt 5, the first optical carriage A is made to be movable in parallel with the reference document base glass 3.

In addition thereto, the first optical carriage A is provided with both of a function of scanning the image on the document mounted and fixed on the reference document base glass 3 and a function of scanning the image on the document which is being fed (flowing document scanning function) while staying at a fixed position.

Further, a lamp 7 arranged at an upper face of the first optical carriage A is a light source for irradiating light to the document. Reflected light irradiated from the lamp 7 and reflected from the document is guided to a charge coupled device (CCD) 9 by a reflecting mirror 8 and a focusing lens 10. CCD 9 is a well-known photoelectric conversion element for converting incident light into an electric signal. Further, a document butting reference plate 11 is provided on the reference document base glass 3.

Meanwhile, the automatic feed apparatus 2 is provided with a document loading tray 13 for mounting and loading the document at an upper portion thereof. The document on the document loading tray 13 is restricted by document side restricting plates 12 at both side portions thereof in a feed (sheet feed) direction.

Further, a document length detecting sensor lever 14 for detecting a length of the document is provided on the document loading tray 13.

In addition thereto, an end portion of the document loading tray 13 in the document feed (sheet feed) direction is provided with a document presence or absence sensor 15 for detecting a front end of the document.

Further, the document feed mechanism 120 is provided at the end portion of the document loading tray 13 in the document feed (sheet feed) direction. A vicinity of an inlet of the document feed mechanism 120 is provided with a weight 16 for holding the front end of the document fed from the document loading tray 13 from an upper side and a document shutter 17 for preventing the front end of the document from being brought into a separate feed portion.

Further, the inlet of the document feed mechanism 120 is provided with a pickup roller 18 for successively reeling out the loaded document from a lowest one thereof. The document reeled out by the pickup roller 18 is fed to a flowing document scanning portion by a feed roller 20 downstream therefrom.

Further, a separating belt 19 provided at a position opposed to the feed roller 20 by interposing the feed path of the document is driven to rotate in a direction reverse to a direction of rotating the feed roller 20. Thereby, overlapped document is separated such that the document is firmly fed sheet by sheet.

Further, there is provided a pre-resist sensor lever 21 for measuring a timing of forming a loop of the document by detecting the front end of the document in the direction of feeding the document by the separating belt 19.

Further, there is provided a resist roller 22 as first feeding means in the direction of feeding the document by passing the pre-resist sensor lever 21. The resist roller 22 feeds the fed document to a first scanning position 25 at a predetermined timing.

Further, the front end of the document fed by the resist roller 22 is detected by a document front end detecting sensor lever 23.

Further, there is provided a document feed upper guide 24 for guiding the document to the first scanning position 25 at a position opposed to the reference document base glass 3.

Further, the first scanning position 25 is disposed at a predetermined clearance provided between the reference document base glass 3 and the document feed upper guide 24. The image of the document surface (first face) is scanned by the first optical carriage staying at the fixed position when the document passes the first scanning position 25.

Figure 3:
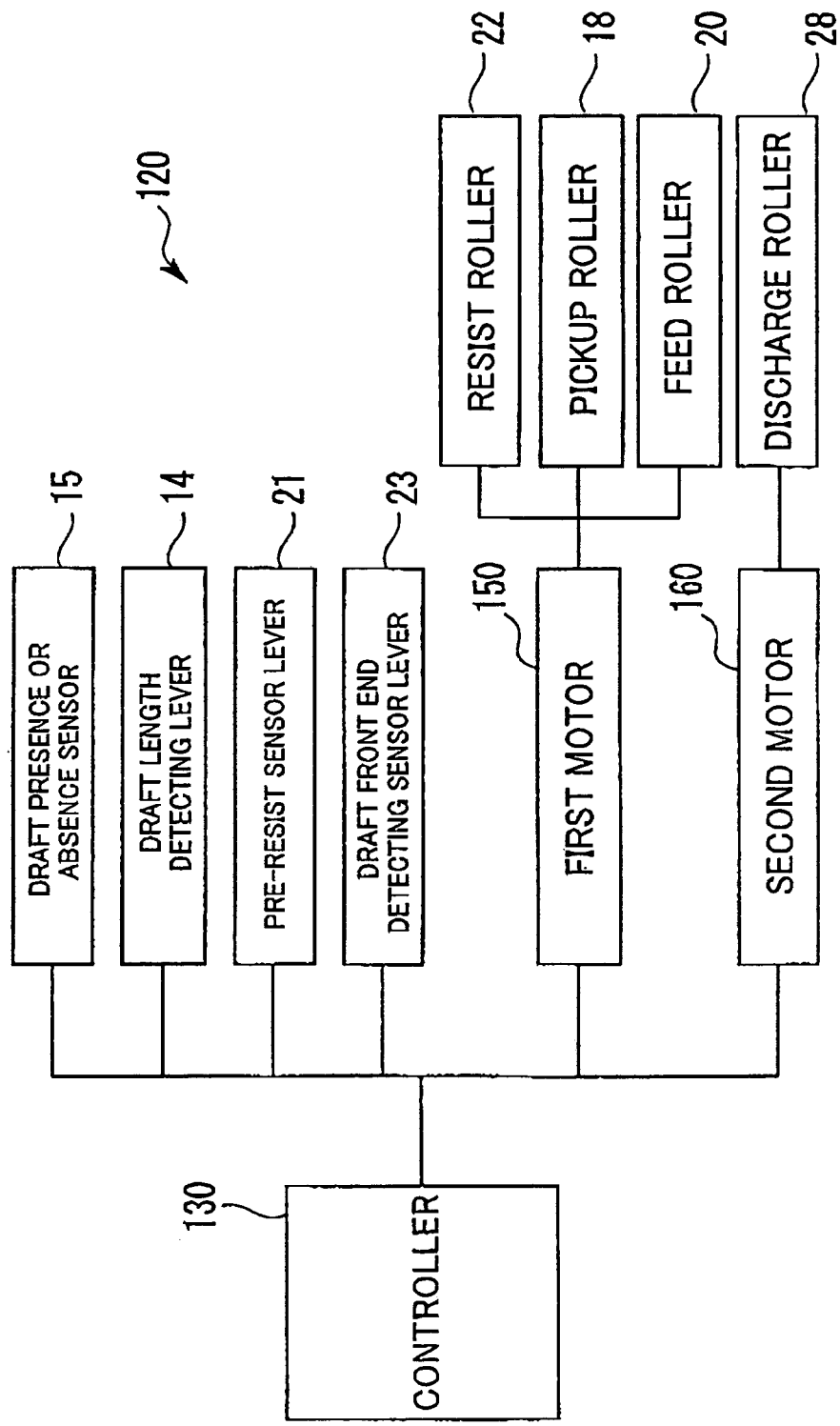
FIG. 3 is a block diagram showing a feed control mechanism of the image scanning apparatus according to the first embodiment, the second embodiment and the third embodiment.

As shown by FIG. 3, the pickup roller 18, the feed roller 20 and the resist roller 22 are driven by one motor (first motor 150). That is, the pickup roller 18 and the feed roller 20 are driven by a regular rotation operation of the motor. At this occasion, the resist roller 22 is not rotated by a one way clutch.

Further, by reversely rotating the first motor 150 at a predetermined timing, the resist roller 22 is rotated and the document is fed to the first scanning position 25. Further, at this occasion, the resist roller 22 is not rotated by the one way clutch.

Further, at inside of the automatic feed apparatus 2 which is holding means for holding a second optical carriage B, the second optical carriage B which is second image scanning means is provided at a position opposed to the first optical carriage A by interposing the reference document base glass 3.

Further, a reflecting mirror and CCD 9 similar to those of the first optical carriage A are arranged at inside of the second optical carriage B.

In this way, the second optical carriage A having a constitution substantially similar to that of the first optical carriage A scans an image included in other face (second face) of the document by a second scanning position 27. Further, the second scanning position 27 is set to more downstream side of the first scanning portion in the transfer path of the document along the reference document base glass 3.

Further, there is provided a discharge roller (second feeding means) 28 for discharging the document passing the second scanning position 27 to outside of the flatbed image scanning portion 1 at a position downstream from the second scanning position 27.

Further, as shown by FIG. 3, the discharge roller 28 according to the first embodiment is driven by a second motor 160 separately from the first motor 150 constituting a drive source of the pickup roller 18, the feed roller 20 and the resist roller 22. Therefore, feed speed of the discharge roller 28 and feed speed of the resist roller 22 can arbitrary be set.

Next, an explanation will be given of the feed control mechanism 120 in the image scanning apparatus 100 according to the first embodiment constituted as described above.

As shown by FIG. 3, the feed control mechanism 120 of the image scanning apparatus 100 according to the first embodiment is constituted by a controller 130 as speed changing means of the invention for controlling the various sensors and motors.

The controller 130 controls to drive the motors based on detection results of the document presence or absence sensor 15, the document front end detecting sensor lever 23, the pre-resist sensor lever 21 and the document length detecting sensor lever 14.

For example, the controller 130 applies a control signal to the first motor 150 for driving the feed roller 20 based on a detection result of presence of the document from the document presence or absence sensor 15.

Further, the controller 130 supplies a control signal to the second motor 160 for driving the discharge roller 28 based on a detection result of detecting the front end of the document detected by the document front end detecting sensor lever 23 and a detection result detected by the document length detecting sensor lever 14.

Further, according to the image scanning apparatus 100 of the first embodiment, the first motor 150 drives the pickup roller 18, the feed roller 20 and the resist roller 22 and the second motor 160 drives the discharge roller 28.

The feed control mechanism 120 of the image scanning apparatus 100 according to the first embodiment is constituted as described above.

Next, an image scanning step (system) according to the first embodiment will be explained. Further, in the following explanation, an explanation will be given on the premise that the document is arranged at the document loading tray 13 and the flowing document scanning for continuously scanning the document is carried out.

First, the document is loaded on the document loading tray 13 of the automatic feed apparatus 2. In the automatic feed apparatus 2, it is detected that the document is placed on the document loading tray 13 by the document length sensor 14 and the document presence or absence sensor 15.

Further, the size of the document is detected by a combination with detection by the document length detecting sensor lever 14 by setting the width of the document by operating the document side restricting plate 12 by an operator.

When a document scanning start button (not shown) is depressed by the operator in the above-described state, the document shutter 17 restricting the front end of the document is opened. Further, a bundle of the document is fed to a separating portion of the document by the weight 16 and the pickup roller 18.

Next, the document is separated and fed sheet by sheet by the separating belt 19 and the feed roller 20. At this occasion, when the front end of the document reaches the resist roller 22 and a predetermined loop is formed by the pre-resist sensor 21, rotation of the feed roller 20 is stopped.

Further, the resist roller 22 starts rotating after a predetermined timing to feed the document. The front end and a rear end of the fed document are detected by the document front end detecting sensor lever 23.

Further, a time period by which the document reaches the first scanning position 25 (see FIG. 2) is calculated by the controller 130 shown in FIG. 3.

The document is guided to the first scanning position 25 by the document feed upper guide 24. At the first scanning position 25, an image of one face of the document is successively scanned while the document is fed at predetermined feed speed.

Further, when the document reaches the second scanning position 27 (see FIG. 2), an image of other face of the document is successively scanned by the second optical carriage B while the document is fed also at the predetermined feed speed.

Further, after the front end of the document has passed the second scanning position 27 and all of the images of the document have been scanned, the document is discharged onto a discharge sheet loading tray 29 (see FIG. 1) by being fed to outside of the image scanning apparatus 100 by the discharge roller 28.

As described above, the resist roller 22 and the discharge roller 28 are driven respectively by the different motors (first motor 150, second motor 260). Therefore, the feed speeds of the resist roller 22 and the discharge roller 28 can arbitrarily be set respectively. Here, the feed speeds of the resist roller 22 and the discharge roller 28 are peripheral speeds when the resist roller 22 and the discharge roller 28 are respectively rotated.

According to this embodiment, when the document is sandwiched by both of the resist roller 22 and the discharge roller to be fed, the feed speed of the discharge roller 28 is set to faster by predetermined speed than the feed speed of the resist roller 22. Thereby, the document is fed in a state of being pulled by the discharge roller 28 and therefore, a deterioration of the feed accuracy by bending the document can be prevented. Further, although the feed speed of the discharge roller 28 is set to speed faster than the feed speed of the resist roller 22 as described above, since nip pressure between the discharge roller 28 and a roller opposed to the discharge roller 28 is set to be small such that the document and the discharge roller slip relative to each other, the feed speed of the document depends on the feed speed of the resist roller 22.

After the rear end of the document comes off the resist roller 22, the document is fed only by the discharge roller 28 which is fed by speed faster than the resist roller 22 and since the feed speed is fast, the document passes the scanning position prior to a predetermined time and therefore, the scanned image is scanned as an image contracted in the feed direction of the document relative to the image of the document. Hence, the discharge roller 28 may be controlled such that when the document is fed only by the discharge roller 28, the feed speed of the discharge roller 28 is decelerated from the feed speed heretofore and the document is fed at speed the same as the feed speed of the resist roller 22 when the document is pinched by both of the resist roller 22 and the discharge roller to be fed. Adverse influence effected on scanning magnification of the image can be alleviated by controlling the feed speed of the resist roller 22 as described above.

Further, at a timing of charging the front end of the document to the discharge roller 28, the feed speed of the discharge roller 28 is controlled to be set faster than the feed speed when the document is pinched by both of the resist roller 22 and the discharge roller to be fed. By setting the feed speed of the discharge roller 28 faster in this way at the timing of charging the front end of the document to the discharge roller 28, resistance in charging the front end of the document to the discharge roller 28 is reduced. Therefore, the deterioration of the behavior of the document can be restrained and the deterioration of image accuracy and occurrence of color shift can be reduced.

Second Embodiment

Next, an image scanning apparatus according to a second embodiment of the invention will be explained. In the image scanning apparatus according to the second embodiment, the feed speed of the resist roller 22 and the feed speed of the discharge roller 28 can be arbitrarily set by controlling rotational numbers of the motors for driving the respective rollers. Further, the image scanning apparatus according to the second embodiment is similar to the image scanning apparatus 100 according to the first embodiment as mentioned above. Therefore, a duplicated explanation thereof will be omitted.

According to the embodiment, when the image is scanned while feeding the document, the image scanning apparatus 100 can set pluralities of scanning speeds of the document by the first optical carriage A and the second optical carriage B by providing pluralities of image scanning resolutions and optimum roller speed ratios are set for the respective scanning speeds.

A fluctuation of feed at an instance at which the rear end of the document comes off the resist roller 22 differs according to the difference between the feed speeds of the resist roller 22 and the discharge roller 28. Therefore, by optimally adjusting the feed speed of the discharge roller 28 relative to the feed speed of the resist roller 22, the disturbance of the behavior of the document at the instance at which the document comes off the resist roller 22 can be restrained.

Such a ratio of the feed speed of the resist roller 22 to the feed speed of the discharge roller 28 is provided with an optimum value respectively relative to an absolute value of the feed speed. For example, when the scanning speed is 108 mm/sec, the feed speed of the discharge roller 28 when the document is fed by both of the resist roller 22 and the discharge roller 28 is set to be faster than the feed speed of the resist roller 22 by 0.5% and when the scanning speed is doubled to 216 mm/sec, the setting is switched such that the feed speed of the resist roller 22 is set to be faster by 1.0%.

Thereby, the feed accuracy of the document can be promoted and the disturbance of the behavior when the rear end of the document comes off the resist roller 22 can be restrained.

As described above, according to the image scanning apparatus 100 of the second embodiment, a plurality of the feed speeds of the document can be set and therefore, the roller speed ratio optimum for the respective scanning speed can be set. Therefore, according to the image scanning apparatus of the second embodiment, stability and fine operational performance of feeding the document can be promoted.

Third Embodiment

Next, an image scanning apparatus according to a third embodiment of the invention will be explained.

The image scanning apparatus according to the third embodiment is characterized in determining a kind of the document by automatic detection or inputted information from the user and arbitrarily controlling the feed speeds of the respective rollers based on the information. Further, the image scanning apparatus according to the third embodiment is similar to the image scanning apparatus 100 of the first embodiment and the second embodiment and therefore, a detailed explanation thereof will be omitted.

For example, when the document is not ordinary sheet but photograph, the image scanning apparatus according to the third embodiment controls to make the movement of the respective rollers slower than that at ordinary speed such that the image can firmly be scanned. For example, when the document is fed by making the feed speed of the discharge roller 28 faster than the feed speed of the resist roller 22, in the case in which the document is photograph, the feed speed of the discharge roller 28 is made slower than that in the case in which the document is ordinary sheet.

Further, when the document is fed by making the feed speed of the discharge roller 28 faster than the feed speed of the resist roller 22, in the case in which the document is thick paper, the difference between the feed speeds of the resist roller 22 and the discharge roller 28 may be controlled to be larger than that in the case of the paper. Further, as described in the first embodiment, the feed speed of the document may be constituted to be dependent on the feed speed of the resist roller 22 by making the feed speed of the resist roller 22 constant and changing the feed speed of the discharge roller 28 in order to produce the difference between the feed speeds of the resist roller 22 and the discharge roller 28 and therefore, the feed speed of the document can be made to be constant regardless of the difference between the feed speeds of the resist roller 22 and the discharge roller 28. According to the embodiment, since the behavior of the document when the rear end of the document comes off the resist roller 22 is stabilized, the scanning accuracy can be promoted for any kinds of the documents.

In order to carry out such a control, in addition to the feed control mechanism 120 (see FIG. 3) according to the first embodiment and the second embodiment, a sensor for detecting luster of the surface of the document or the thickness of the document (not shown) may be provided.

Further, the controller 130 determines the kind of the document based on a detection result from the sensor and transmits output values in accordance with the kind of the document to the respective motor (first motor 150, second motor 160). Further, the respective motor (first motor 150, second motor 160) drive the resist roller 22 and the discharge roller 28 based on the received output values.

The feed sped can be set in accordance with the size or the kind of the document in this way, a further stabilized feed function can be achieved.

As explained above, the invention can provide the image scanning apparatus stabilizing the behavior of the document in scanning the image and enabling to promote the image scanning accuracy.

What is claimed is:

1. An image scanning apparatus comprising:
   a first feeding unit configured to feed a document;
   a second feeding unit configured to feed the feed the document which has fed by the first feeding unit;
   an image scanning unit configured to scan an image of the document at a scanning position provided between the first feeding unit and the second feeding unit; and
   a speed controller configured to set feed speeds of the first feeding unit and the second feeding unit;
   wherein the image scanning unit can scan an image of the document at a first scanning speed or a second scanning speed, and the speed controller sets the feed speed of the first feeding unit and the feed speed of the second feeding unit such that when the document is fed by both of the first feeding unit and the second feeding unit, a ratio of the feed speed of the first feeding unit to the feed speed of the second feeding unit when the document is scanned at the first scanning speed is different from a ratio of the feed speed of the first feeding unit to the feed speed of the second feeding unit when the document is scanned at the second scanning speed.

2. The image scanning apparatus according to claim 1, wherein when the document is fed by both of the first feeding unit and the second feeding unit, the speed controller sets the feed speed of the first feeding unit and the feed speed of the second feeding unit such that the feed speed of the second feeding unit becomes faster than the feed speed of the first feeding unit.

3. The image scanning apparatus according to claim 2, wherein the first scanning speed is faster than the second scanning speed, and when the document is fed by both of the first feeding unit and the second feeding unit, the speed controller sets the feed speed of the first feeding unit and the feed speed of the second feeding unit such that a first ratio of the feed speed of the first feeding unit to the feed speed of the second feeding unit when the document is scanned at the first scanning speed is smaller than a second ratio of the feed speed of the first feeding unit to the feed speed of the second feeding unit when the document is scanned at the second scanning speed.

4. An image scanning apparatus comprising:
   a first feeding unit, configured to feed a document, is set to a predetermined feed speed when either a first kind of document or a second kind of document is fed;
   a second feeding unit, configured to feed the document which has been fed by the first feeding unit, is set at one feed speed when the first kind of document is fed, and at a different feed speed when the second kind of document is fed;
   an image scanning unit configured to scan an image of the first and second kinds of documents at a scanning position provided between the first feeding unit and the second feeding unit; and
   a speed controller configured to set the feed speeds of the first feeding unit and the second feeding unit
   wherein when either a first kind of document or a second kind of document is fed by both of the first feeding unit and the second feeding unit, the respective feed speeds are controlled by the speed controller so that the speed of the first feeding unit becomes a predetermined feed speed, and so that the feed speed of the second feeding unit when the first kind of document is fed and the feed speed of the second feeding unit when the second kind of document is fed are different from each other.

5. The image scanning apparatus according to claim 4, wherein when a thin document is fed as the first kind of document, the speed controller sets a faster feed speed of the second feeding unit than the feed speed when a thick document is fed.

6. The image scanning apparatus according to claim 4, wherein when a document is fed by both of the first feeding unit and the second feeding unit, the feed speed of the first feeding unit is faster than the feed speed of the second feeding unit.

7. The image scanning apparatus according to claim 1, wherein a feed power of the second feeding unit is weaker than a feed power of the first feeding unit, and when a document is fed by both of the first feeding unit and the second feeding unit, the feed speed of the document depends on the feed speed of the first feeding unit.

8. The image scanning apparatus according to claim 4, wherein a feed power of the second feeding unit is weaker than a feed power of the first feeding unit, and when a document is fed by both the first feeding unit and the second feeding unit, the feed speed of the document depends on the feed speed of the first feeding unit.

* * * * *